Figure 1:
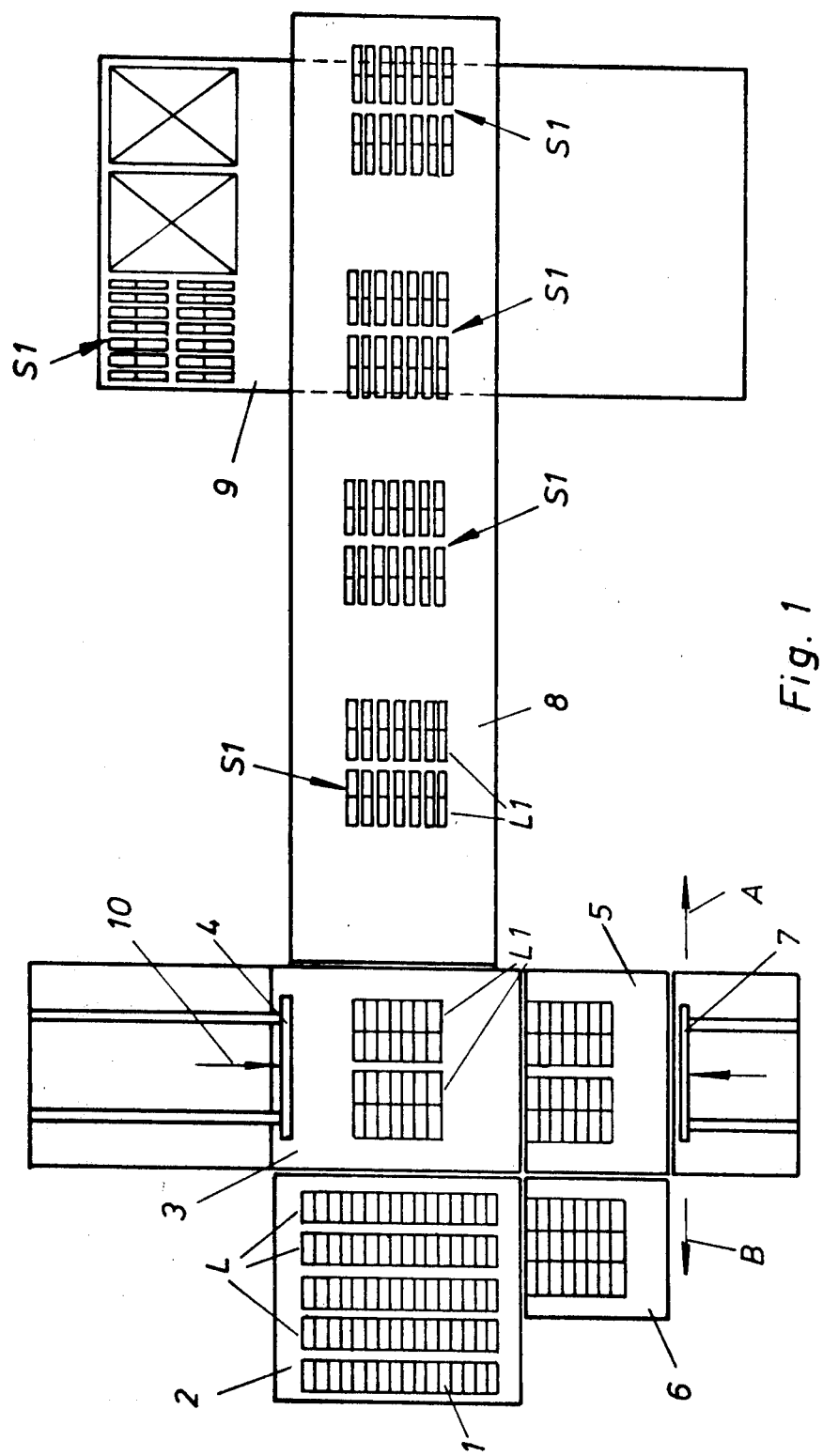

United States Patent [19]

Kamphues

[11] 4,018,324
[45] Apr. 19, 1977

[54] PROCESS AND APPARATUS FOR ARRANGING BRICKS IN SETTING LAYERS OF RECTANGULAR CONFIGURATION

[75] Inventor: Hermann Kamphues, Laggenbeck, Germany

[73] Assignee: C. Keller & Co., Laggenbeck, Germany

[22] Filed: Aug. 26, 1975

[21] Appl. No.: 607,935

[52] U.S. Cl. .............................. 198/347; 198/419; 214/6 A; 214/6 P

[51] Int. Cl.² ........................................ B65G 47/26

[58] Field of Search ................. 214/6 A, 6 M, 6 P; 198/30, 347, 419

[56] References Cited

UNITED STATES PATENTS 3,837,466  9/1974  Jones ........................... 198/30
3,876,057  4/1975  Jones ........................... 198/30

*Primary Examiner*—Evon C. Blunk
*Assistant Examiner*—Douglas D. Watts
*Attorney, Agent, or Firm*—Richard D. Weber

[57] ABSTRACT

Bricks are conveyed to a grouping device in rows for arrangement into setting layers which are placed in crosswise relation on kiln cars for firing. Excess bricks in the rows are pushed off the grouping device onto one of a pair of storage tables until a sufficient number are accumulated on the table to form a setting layer. The storage tables are movable and are alternately positioned adjacent the grouping device to permit formation of two different setting layer configurations.

3 Claims, 2 Drawing Figures

PROCESS AND APPARATUS FOR ARRANGING BRICKS IN SETTING LAYERS OF RECTANGULAR CONFIGURATION

This invention concerns a process for arranging bricks in setting layers of rectangular configuration, suitable for crosswise stacking of one layer above another, by feeding a plurality of adjacent transverse rows, consisting of indeterminate quantities of bricks, onto a grouping device where compact layers are being arranged, which are subsequently rearranged into setting layers by the creation of predetermined spaces between the bricks. This invention further covers equipment for the implementation of that process.

The German Pat. No. 1,608,681 contains a process for arranging bricks in setting layers of rectangular configuration, where the equipment for implementation of that process consists of two conveyor belts mounted adjacent to each other. At the end of the first conveyor belt, the bricks are arranged in a rectangular setting layer configuration. To achieve a setting layer which, after 90° rotation would match, in crosswise stacking, the rectangular layer arranged on the first conveyor, a transfer gripper is utilized which lifts off a portion of the bricks delivered on the first conveyor and deposits them after 90° rotation on the second conveyor belt. Thus, at the end of the second conveyor a setting layer is assembled in which the bricks are arranged at right angles to the ones in the setting layer at the end of the first conveyor. A setting gripper is used to alternatively pick setting layers from the two conveyors and stack them on the kiln car in crosswise fashion.

The disadvantage of the previously known process is in that the incoming bricks can be arranged into only one size of setting layer. However, to achieve optimum firing of a particular clay composition a different size setting layer is often required, designed to suit that firing process. This cannot be achieved with the previously known process.

The equipment used for implementation of the previously known process also has the disadvantage that, by virtue of the two adjacent conveyor belts and the need of a transfer gripper required for loading of the second conveyor, the construction is complicated and costly.

Thus, it is the purpose of this invention to improve the previously known process, so that the incoming bricks can be combined into setting layers of various sizes and yet always of rectangular configuration, or, when required, of square configuration, while the equipment used for implementation of that process is extremely simple and can be constructed from reliable components.

This goal, aimed at a process for arranging bricks in setting layers of rectangular configuration is conceptually attained in that in each instance, prior to the assembly of compact layers, the quantity of bricks in the transverse layers is reduced to a predetermined number by the removal of the excess amount. This predetermined quantity coincides with that required for the rearranged setting layers. The bricks thus removed are stored until their number reaches the requirement of a compact layer, before they are fed to the grouping device for the assembly of setting layers.

The advantage of this approach is in the ability to assemble setting layers of varying configurations. By feeding a varying number of transverse rows, one can assemble setting layers which correspond to the requirements of various materials and firing processes. It is obvious that by these means one can assemble not only rectangular but also square setting layers. The storage of those bricks removed from the transverse rows is used to assemble additional compact layers in addition to those achieved by the normal sequence: delivery, grouping, discharge. These additional compact layers are then fed to the grouping device for the assembly of setting layers. This results in time saving and thus a greater output efficiency.

This invention also includes equipment for the implementation of this process, significant in that the grouping device is served by two storage tables which can alternatively slide into position adjacent to the grouping table. These storage tables receive the bricks which are removed from the grouping device and store them until the quantity corresponding to that of a compact layer is reached. A pushing device is used to push these compact layers from the storage tables onto the grouping device.

The equipment according to this invention is of simple construction, by virtue of the utilization of sliding storage tables in lieu of a second conveyor and transfer gripper. This also results in a cost advantage.

The drawings schematically depict equipment in accordance with the invention for the implementation of the present process:

FIG. 1: A plan view of equipment according to the present invention.

Figure 2:
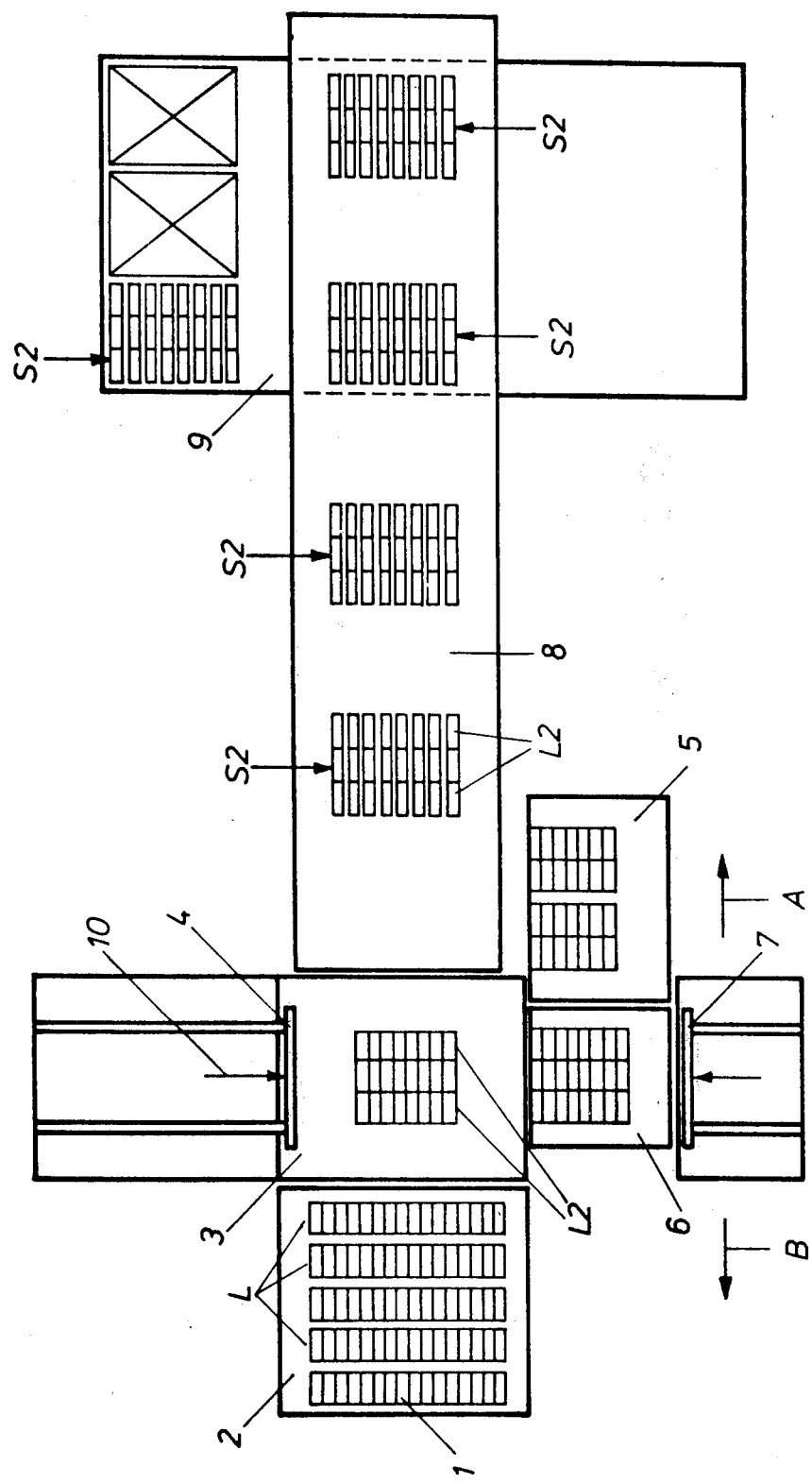

FIG. 2: An additional plan view of equipment according to this invention showing the storage tables in another position.

The bricks 1 adjacent to each other in transverse rows L are delivered by a conveyor 2. The conveyor 2 transports the transverse rows L to a grouping device 3 where, for example, rectangular setting layers as required for rectangular hacks, are being assembled. These setting layers according to the required hack size may, for example, consist of three or four transverse rows L1 or L2. A pusher 4 pushes the transverse rows L of bricks 1 across the feeding device in a direction transverse to their supply direction. It is obvious that setting layers of different sizes can also be assembled. In addition, square setting layers can be achieved.

Since the transverse rows L, as fed into the device, do not match the length of transverse rows L1 or L2 in setting layers S1 and S2, any excess bricks 1 must be removed from these transverse rows L. To accomplish this, storage tables 5 and 6 are located to the side of the grouping device 3. These storage tables will accommodate all bricks 1 not required for setting layers S1 and S2. The storage tables 5 and 6 can be moved in the direction indicated by arrows A and B, in such a fashion as would alternately place storage table 5 or storage table 6 into an operating position adjacent to the grouping device 3. A pushing device 7 is provided to selectively return the bricks 1 from the storage tables 5 and 6 to the grouping device 3.

The setting layers S1 and S2 being assembled on the grouping device 3 are transferred to a discharge conveyor 8 from which they are removed by a setting gripper (not shown). The gripper head is alternately rotated 90° in depositing the setting layers on the kiln car to produce a stacked array known as a hack.

To assemble setting layers of rectangular configuration suitable for crosswise stacking, one would use the following method. Four transverse rows L consisting of bricks 1 are fed onto the grouping device 3 by the conveyor 2. This will result in compact layers whose width does not coincide with that of the eventual setting layer S1, i.e. the longitudinal rows L will contain too many bricks 1, some of which will have to be removed before the specified width of the eventual setting layer can be attained. This is accomplished by moving the four, transverse rows L on the grouping device by means of pusher 4 in the direction of arrow 10, thereby transferring the excess number of bricks onto a storage table 5, where they are stored for future use. The bricks which remain on the grouping device 3 in thus foreshortened transverse rows are arranged into a setting layer S1 which will be transferred to the discharge conveyor 8 from where it will be removed by the gripper and, after 90° rotation, placed on the kiln car (FIG. 1).

In building the hack, crosswise stacking is necessary as it affords sufficient stability to withstand the effect of kiln car movement. As this type stacking cannot be achieved with the original setting layer S1, an alternate layer S2 has to be assembled which would match the layer S1 in length and width. This setting layer S2 is assembled by feeding only three transverse rows L from the infeed conveyor 2 onto the grouping device 3, to create another compact layer. As its size also does not coincide with that of the eventual setting layer S2, the excess bricks are again removed from the transverse rows L by the pusher 4. These bricks are pushed from the grouping device onto a storage table 6 which has in the meantime, been moved in the direction of arrow A into its operating position adjacent to the grouping device.

The bricks 1 remaining on the grouping device 3 in transverse rows L2 are assembled into a setting layer S2 which will enter the discharge conveyor 8 from which they will be removed by the gripper and without rotation placed on top of a layer S1 on the kiln car. For the creation of rectangular hacks one requires the alternate setting of layers S1 and S2 onto the kiln car 9.

The bricks on storage tables 5 and 6 remain there until by delivery of additional bricks from the grouping device 3, layers have been assembled which conform in width and length to those of the setting layers S1 and S2. At that point, the feed of transverse rows from conveyor 2 to the grouping device 3 is momentarily interrupted and the pusher 7 is actuated to push the layers alternatively from storage tables 5 and 6, while these are in operating position adjacent to the grouping device, onto said grouping device. There, bricks transferred from storage table 5 are rearranged into setting layer S1 and those from storage table 6 into setting layer S2. These are then transferred to the discharge conveyor 8 and eventually set onto the kiln car 9.

It is obvious that to transfer bricks from the storage tables 5 and 6, the particular storage table from which the bricks are being transferred must be in operating position adjacent to the grouping device 3. After this has transpired, the feed of transverse rows 1 from the delivery conveyor to the grouping device 3 is resumed and the process is repeated in the above described fashion.

I claim:

1. In apparatus for arranging unfired bricks in setting layers of rectangular configuration suitable for crosswise stacking of one layer above another and including a delivery conveyor for carrying transverse rows of bricks, and a grouping device adapted to receive the brick rows from said delivery conveyor, arrange the bricks into compact layers and spread the bricks in predetermined spacing to create setting layers, the improvement comprising two table surfaces adapted for selective alternate movement into a brick transfer position adjacent said grouping device for receiving excess bricks from the brick rows on said grouping device and storing said bricks until their aggregate number reaches that required for a compact layer, pusher means for selectively moving the excess bricks from said grouping device to the one of said table surfaces which is in the transfer position, and pusher means for selective transferring the stored bricks from the one of said table surfaces which is in the transfer position to said grouping device, said storage table surfaces permitting excess bricks to remain on either one of said table surfaces while the other of said table surfaces is in the brick transfer position.

2. In a process for arranging unfired bricks in setting layers suitable for crosswise stacking to form rectangular hacks, said hacks comprising alternate setting layers of first and second brick configurations, and including the steps of feeding a plurality of adjacent transverse rows, each row comprising an indeterminate number of bricks, onto a grouping device where compact layers arranged from these rows, and rearranging the compact layers into setting layers by the creation of predetermined spaces between the bricks, the improvement comprising the steps during predetermined intervals of alternately:

a. feeding a predetermined number of transverse rows as required for said first setting layer configuration onto said grouping device, reducing the number of bricks in the transverse rows to the predetermined number required for the first setting layer configuration by removal of the excess bricks prior to assembly of the compact layers, accumulating the removed excess bricks on a first table surface adjacent the grouping device until their aggregate number reaches that required for a compact layer corresponding to a first setting layer configuration, and thereupon transferring the accumulated bricks back to the grouping device for arrangement into a setting layer of said first configuration; and b. feeding a predetermined number of transverse rows as required for said second setting layer configuration onto said grouping device, reducing the number of bricks in the transverse rows to the predetermined number required for the second setting layer configuration by removal of the excess bricks prior to assembly of the compact layers, accumulating the removed excess bricks on a second table surface adjacent the grouping device until their aggregate number reaches that required for a compact layer corresponding to a second setting layer configuration, and thereupon transferring the accumulated excess bricks back to the grouping device for arrangement into a setting layer of said second configuration.

3. The invention as claimed in claim 2 wherein said table surfaces are selectively movable into a position adjacent said grouping device, and wherein bricks of said first setting layer configuration may remain on said first table surface during the accumulation of bricks of said second setting layer configuration on said second surface and vice versa.

* * * * *